United States Patent
Brillon et al.

(10) Patent No.: US 9,430,889 B2
(45) Date of Patent: Aug. 30, 2016

(54) METHOD FOR PROTECTING A HANDS-FREE ACCESS AND/OR STARTING SYSTEM OF A VEHICLE BY MODIFYING THE SPEED OF SIGNAL RECEPTION

(71) Applicants: Alain Brillon, Villeneuve Tolosane (FR); Isabelle Verdon, Cornebarrieu (FR)

(72) Inventors: Alain Brillon, Villeneuve Tolosane (FR); Isabelle Verdon, Cornebarrieu (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 177 days.

(21) Appl. No.: 14/308,991

(22) Filed: Jun. 19, 2014

(65) Prior Publication Data
US 2015/0002266 A1    Jan. 1, 2015

(30) Foreign Application Priority Data
Jun. 28, 2013  (FR) ...................... 13 56256

(51) Int. Cl.
G07C 9/00      (2006.01)
B60R 25/24     (2013.01)

(52) U.S. Cl.
CPC .......... *G07C 9/00111* (2013.01); *B60R 25/24* (2013.01); *G07C 9/00309* (2013.01); *G07C 2009/00555* (2013.01)

(58) Field of Classification Search
USPC ....................................................... 340/5.72
See application file for complete search history.

(56) References Cited

U.S. PATENT DOCUMENTS

| | | | |
|---|---|---|---|
| 5,550,536 A | 8/1996 | Flaxl et al. | |
| 5,945,906 A * | 8/1999 | Onuma | B60R 25/00 307/10.3 |
| 6,144,113 A * | 11/2000 | Hayashi | B60R 25/04 180/287 |
| 6,225,889 B1 * | 5/2001 | Furuta | B60R 25/24 340/425.5 |
| 6,374,081 B1 * | 4/2002 | Gold | B60R 25/24 340/425.5 |
| 6,424,254 B1 | 7/2002 | Rydel | |

(Continued)

FOREIGN PATENT DOCUMENTS

| | | |
|---|---|---|
| EP | 1 052 353 | 11/2000 |
| EP | 1 288 841 | 3/2003 |

(Continued)

OTHER PUBLICATIONS

French Search report dated Mar. 26, 2014 in corresponding French priority application.

*Primary Examiner* — Brian Miller
(74) *Attorney, Agent, or Firm* — Young & Thompson

(57) ABSTRACT

Method for improving the security of communication between the electronic key and vehicle to prevent interception by a third-party item of electronic equipment by highlighting in such event, a time delay in acknowledgement of this signal by the key. This method includes, before authorizing the access to and/or starting of the vehicle, additional steps of adapting the amplitude of a coded identification request signal received by the key to reach the detection threshold of the key as soon as possible; measuring the sum of the duration of the emission of the coded interrogation signal and of the duration of the response signal of the electronic key; comparing the sum of the measured durations to a reference duration, and triggering an alarm relating to the conditions of access to and/or starting of the vehicle when the separation between this sum of durations and the reference duration is above a preset threshold.

13 Claims, 3 Drawing Sheets

(56) References Cited

U.S. PATENT DOCUMENTS

| | | | |
|---|---|---|---|
| 6,870,459 B1 | 3/2005 | Fest et al. | |
| 6,965,296 B2 * | 11/2005 | Kamlah | B60R 25/00 340/10.41 |
| 7,420,455 B2 * | 9/2008 | Nowottnick | B60R 25/24 340/5.61 |
| 7,545,254 B2 * | 6/2009 | Brillon | B60R 25/245 340/10.2 |
| 8,638,202 B2 * | 1/2014 | Oesterling | G07C 9/00309 307/10.3 |
| 8,970,346 B2 * | 3/2015 | Baumgartner | B60R 25/04 340/5.72 |
| 2003/0146822 A1 * | 8/2003 | Brillon | B60R 25/04 340/10.3 |
| 2005/0024181 A1 * | 2/2005 | Hofbeck | B60R 25/02 340/5.7 |
| 2007/0085659 A1 * | 4/2007 | Anderson | B60R 25/24 340/5.72 |
| 2008/0024322 A1 * | 1/2008 | Riemschneider | G06K 7/0008 340/904 |
| 2008/0085733 A1 | 4/2008 | Ochi et al. | |
| 2014/0240088 A1 * | 8/2014 | Robinette | G08B 13/1427 340/5.61 |
| 2014/0240090 A1 * | 8/2014 | Mutti | B60R 25/24 340/5.61 |
| 2015/0002266 A1 * | 1/2015 | Brillon | G07C 9/00111 340/5.72 |

FOREIGN PATENT DOCUMENTS

| | | |
|---|---|---|
| EP | 2 242 027 | 10/2010 |
| FR | 2 933 437 | 1/2010 |

* cited by examiner

US 9,430,889 B2

METHOD FOR PROTECTING A HANDS-FREE ACCESS AND/OR STARTING SYSTEM OF A VEHICLE BY MODIFYING THE SPEED OF SIGNAL RECEPTION

BACKGROUND OF THE INVENTION

The present invention relates to a method for protecting a hands-free starting system for motor vehicles. The invention concerns vehicles equipped with an authorization system for starting the engine of the vehicle, generally associated with a system of hands-free access, i.e. of detection of an electronic key for the locking or unlocking of openings.

For these two systems, information is transmitted between one or more emitters/receivers located in the vehicle and the electronic key carried by the user of the vehicle. With this aim, the vehicles are provided with items of electronic equipment intended to bring to the driver user-friendliness and security, such as in particular equipment for locking and unlocking the vehicle, and for starting it.

In this equipment, transmission is carried out by radio frequency signals, in the low-frequency region, 125 kHz for example, for their emission from the vehicle, and in an authorized radio frequency region, for example at 433 MHz or 315 MHz, for their emission from the electronic key.

The use of a physical key for locking or unlocking openings and for starting has thus been replaced by remote unlocking and, for starting, pressing for example on a button, the key remaining in the pocket or bag of the driver, close to said button.

These hands-free access and starting systems are named, for example, PASE (Passive Access and Start Engine) or PKES (Passive Keyless Entry and Start) systems. These hands-free systems are particularly advantageous because the driver no longer has to search through his pocket or bag to find the key.

However, using radio frequency communications instead of a physical key presents a security problem: specifically, this use can allow the interception of the radio frequency communications by third-party electronic equipment. To mitigate this risk, provision has been made to secure exchanges of information in the locking/unlocking and starting authorization protocols.

More precisely, the usual protocol of a hands-free access and starting system comprises the following steps:
 a central control unit on board the vehicle remains on standby awaiting the detection of an unlocking request, which can take the form either of a hand approaching a capacitive sensor situated in the handle of a door, or pressing a door handle or key button;
 following the unlocking request, the emitter of the vehicle (situated in the passenger compartment and/or in the door handles) sends a coded identification request to the key in response; these messages are sent at low frequency (called LF) at 125 kHz and have a short range, from about 1.5 to 2 meters;
 if one of the electronic keys of the vehicle is in the perimeter of this range, it emits its identification in the radio frequency band (for example 433 MHz or 315 MHz) with a range between about 30 and 120 meters;
 if the response of the electronic key is recognized as genuine by the vehicle, the latter authorizes the unlocking of the vehicle;
 the doors unlock without any other physical contact;
 if the user of the vehicle is seated inside his or her vehicle and wishes to start it, the central control unit then detects, for example, a press on the starting button, then another exchange of information is engaged with the electronic key and the latter must be authenticated again. If these tests are successfully passed, the vehicle starts.

This hands-free access and starting protocol is illustrated in FIGS. 1a and 1b. FIG. 1a represents the case of standard operation, and FIG. 1b a case of hands-free access and starting with interception by a third-party item of electronic equipment. In these two figures, the exchanges of information between the vehicle and its key or one of its electronic keys are transmitted by signals between two timescales "t", one for the vehicle denoted "C", and the other for the electronic key "K", the time "t" running in the direction of the arrows, from top to bottom in the example.

The exchange of messages begins with the emission of a coded identification signal 5 by the vehicle C for the attention of the electronic key K, following the detection of the approach of a hand or of a press of a door handle or starting button. The coded identification signal 5 contains a coded identification request. The electronic key K supplies a response to this request with the same code using a message contained in a coded response signal 7 and received by the vehicle C.

However, the acknowledgement of the coded request by the electronic key K can be deferred, and a deferred response signal 9 is then transmitted after a time lag $\Delta tk$ with respect to the transmission of an undeferred coded response signal 7.

This delay $\Delta tk$ of acknowledgment can be due, in particular:
 to a slow increase in the amplitude of the coded identification signal, due to a quality factor calibrated to allow a long range of said signal, or
 to a combination of a minimum threshold of variable detection of the signal received by the electronic key and the sinusoidal nature of this signal, implying variations in the measurement of the intensity of the received signal (cf. FIGS. 2a and 2b for a more detailed description).

For the vehicle C, the duration encompassing the transmission of the coded request and the response, also coded, of the electronic key (corresponding to the durations of transmission of the signals of identification 5 and response 7) is denoted t1. If the electronic key K responds with a time lag $\Delta tk$ (with the deferred response signal 9), the overall duration t1 is also delayed and takes a value $t1+\alpha t1$ (with a duration of delay $\Delta t1$ substantially equal to $\Delta tk$).

FIG. 1b repeats the exchange of messages in FIG. 1a but in the case of interception by a third-party item of electronic equipment. The coded identification signal is then received with a delay D. The transmission of this delayed identification signal 5' is therefore "tilted" between the timescales of the vehicle C and the electronic key K due to this delay D, compared to the transmission of the non-delayed identification signal 5. The coded identification request is then delayed by the same duration D upon its reception by the electronic key. And the exchange encompassing the transmission of the delayed identification signal 5' and of the equally delayed response signal 7' has a duration t2 substantially longer than the duration t1, of about 8 to 32 milliseconds in the example.

The duration t1 is the reference duration validated by the manufacturer and a difference between the durations t1 and t2 signifies the presence of an interception by a third-party item of electronic equipment. This stems from the fact that the interception equipment generally includes resonant or equivalent electrical circuits that disturb transmission and induce delays in the reception of the information emitted by the vehicle for the attention of the electronic key.

This interception is then validated if the difference t2−t1 is above a preset duration, equal to 50 milliseconds in this example. However, this duration t2 can be close to the duration t1+Δt1 shown above (FIG. 1a), which corresponds to the electronic key not immediately acknowledging the coded identification request, as shown previously. And the excessive closeness of these two durations, t1+Δt1 and t2, can then give rise to an interpretation error on the part of the vehicle. This example shows that the time lag (duration Δtk) contributed by the electronic key K when acknowledging the identification request in the absence of any interception can be equivalent to the delay D contributed by the interception performed by a third-party item of electronic equipment.

This situation impedes the making of decisions at vehicle level concerning the possible presence of an item of electronic equipment intercepting the signal. It is therefore important to be able to differentiate between the delay Δtk due to the electronic key and the delay D provoked by the intercepting equipment.

In these conditions, wireless communications between the vehicle and an electronic key can therefore be intercepted easily. At the present time, various solutions have been proposed to protect the vehicle from an undesirable interception. The patent document FR 2 933 437 proposes to set up detection zones around the vehicle to authorize first, out of a concern for security, the lateral unlocking of a door or of a group of doors only on the side where the fob that has been authenticated by the vehicle is found.

Moreover, the use of codes regularly renewed using code generating equipment is now widespread. Such a system is described in the patent document U.S. Pat. No. 6,870,459 for example.

But these solutions do not make it possible to reliably detect the interception of communications between a key and a vehicle by a third-party item of equipment.

SUMMARY OF THE INVENTION

The invention aims to improve the security of the communication system between the electronic key and the vehicle while detecting any interception by a third-party item of electronic equipment, and to avoid any access and/or starting without a key that has been identified in a valid manner. To do this, the invention makes provision for rapid acknowledgement of the coded interrogation signals received by the electronic key in order to identify any delay in reception at the level of the key provoked by a third-party item of electronic equipment.

More precisely, the subject of the present invention is a method for protecting a hands-free access and/or starting system of a motor vehicle equipped with at least one electronic key. This method includes a step of emitting a coded identification request emitted by an antenna of a central control unit of said system in the form of a coded interrogation signal intended for the electronic key, a step of the electronic key responding to give its identity, and a step of authorizing the access to and/or starting of the vehicle.

To estimate the presence of an intercepting item of electronic equipment, this method furthermore includes, before the step of authorizing the access to and/or starting of the vehicle, additional protection steps consisting in:
  adapting the amplitude of at least one signal received by the electronic key to reach an amplitude detection threshold of the electronic key as soon as possible;
  stopping said amplitude adaptation as soon as the electronic key is identified in the responding step;
  measuring a sum of durations of transmission of the coded interrogation signal and of the response signal of the electronic key;
  comparing the sum of the measured durations to a reference duration;
  prohibiting the access to and/or starting of the vehicle when a difference between this sum of durations and the reference duration is above a preset threshold; and
  triggering an alarm when the difference between this sum of measured durations and the reference duration is above the preset threshold.

Advantageously, a substantial difference then highlights the presence of a third-party item of electronic equipment. And this faster rise in the amplitude of the signal received by the electronic key makes it possible to reduce the time needed to reach the minimum amplitude for detection of the received signal, which improves the response speed of the key, and therefore the precision and reliability of the measurement. This therefore makes it possible to remove any delay Δtk related to acknowledgment of the reception signal by an electronic key, and to thus determine more easily the possible presence of an interception by a third-party item of electronic equipment.

According to advantageous particular features, the method according to the invention provides:
  the adapting of the amplitude of the sinusoidal signal received by the electronic key in the coded identification request step is achieved by a reduction in the quality factor of said electronic key, called "Q factor";
  the reduction in the Q factor is requested by the central control unit upon the emission of the coded identification request;
  the request for a reduction in the Q factor of the electronic key consists in the emission of an additional frame without data, of preset duration;
  the request for a reduction in the Q factor of the electronic key consists in a change in the length of the coded interrogation signal;
  the reduction in the Q factor of the electronic key is performed immediately after reception of the additional frame;
  the reduction in the Q factor of the electronic key is performed gradually after reception of the particular frame in order not to disturb the operations in process by the electronic key;
  the sum of the measured durations is computed from several sensors distributed over the vehicle;
  the reference duration corresponds to a duration of an electromagnetic two-way communication between the vehicle and the electronic key without an interception of communication;
  the threshold above which alarms are triggered is comprised between 5 and 100 milliseconds, preferably between 8 and 64 milliseconds.

BRIEF DESCRIPTION OF THE DRAWINGS

Other data, features and advantages of the present invention will become apparent upon reading the non-limited description that follows, made with reference to the appended figures that represent, respectively.

DETAILED DESCRIPTION OF THE
PREFERRED EMBODIMENTS

Figure 2A:
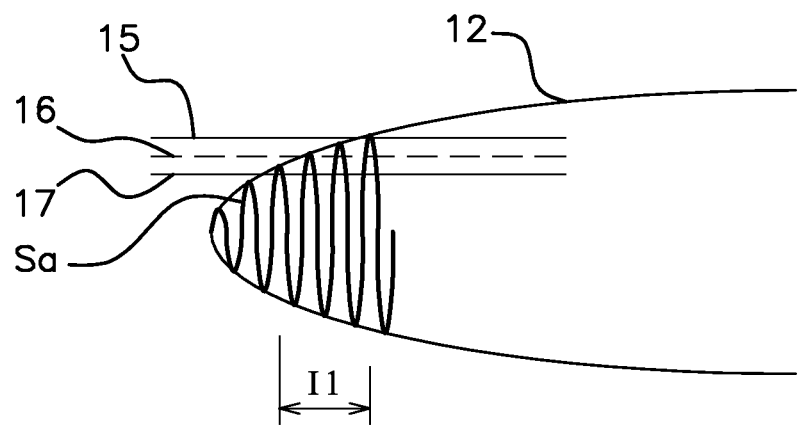
FIGS. 2a and 2b, a diagram of an example of a sinusoidal signal received by the electronic key obtained with a standard Q factor (FIG. 2a) and a reduced Q factor according to the invention (FIG. 2b) respectively.
Figure 2B:
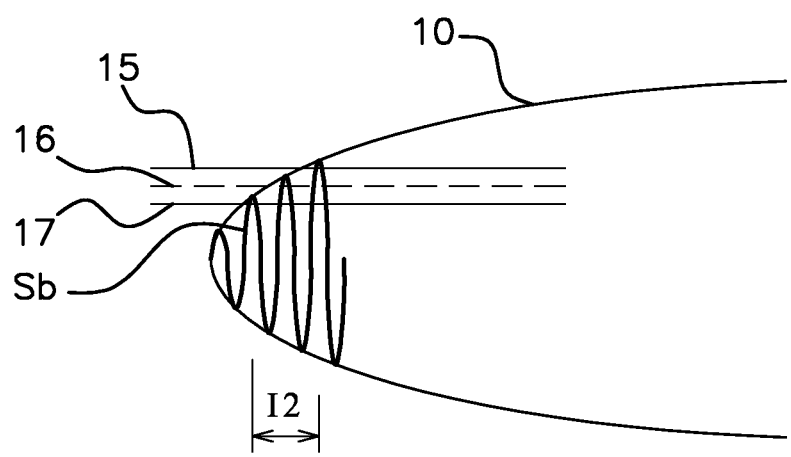

FIGS. 2a and 2b show examples of coded sinusoidal signals Sa and Sb with envelopes 12 and 10, as received by the electronic key, with a standard Q factor (FIG. 2a) and a reduced Q factor according to the invention (FIG. 2b) respectively.

Figure 1A:
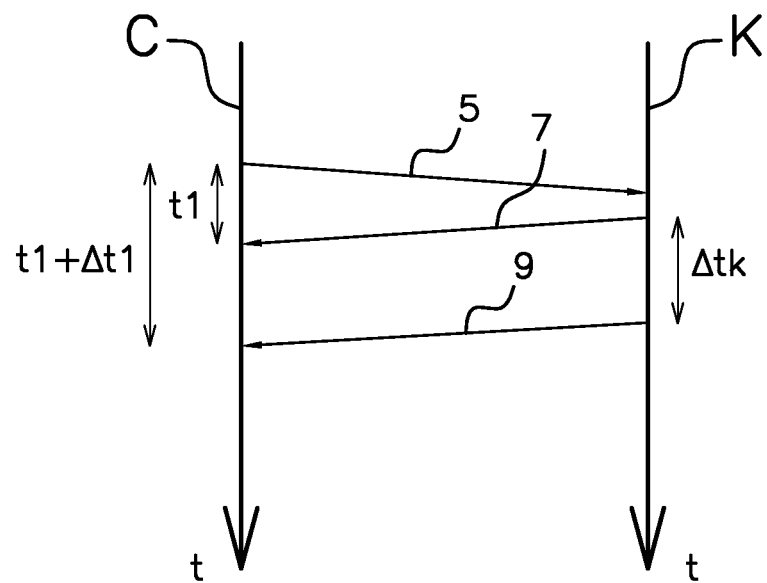
FIGS. 1a and 1b, representations in the form of timescales of the protocol of exchanges between a hands-free access and starting system and an electronic key according to the prior art, in the absence and the presence of a third-party item of electronic equipment respectively (figures already commented on)
Figure 1B:
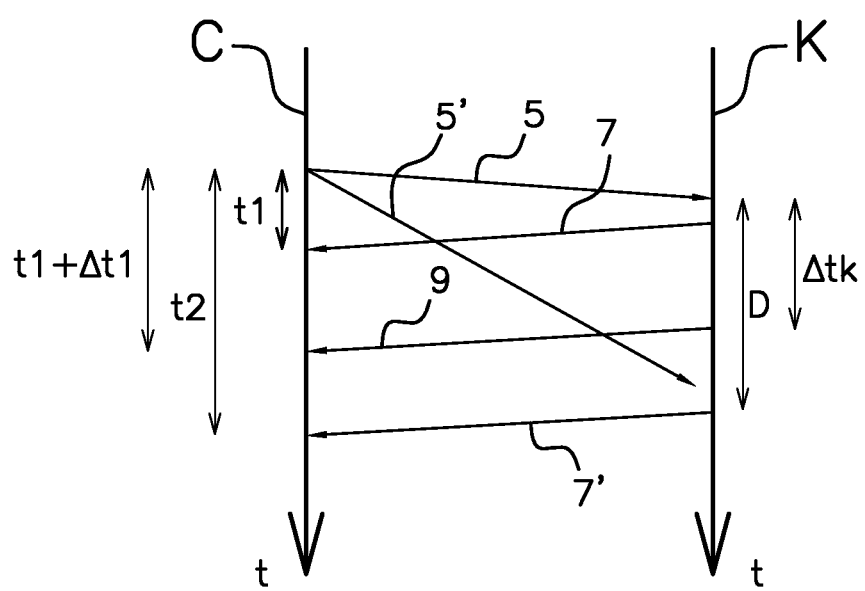

Whether in the case of a standard or reduced Q factor, the received sinusoidal signal Sa or Sb corresponds to the signal received by the key K with reference to FIG. 1a or 1b, following the request for identification by way of coded interrogation signals 5 or 5', in the case of a transmission without or with interception respectively.

In the case of a reduced Q factor, the envelope 10 of the received sinusoidal signal Sb shows a slower growth over time than for the envelope of the received sinusoidal signal Sa corresponding to a standard Q factor. The received sinusoidal signals Sa and Sb represent the state in which the signal at 125 kHz (periods of 8 milliseconds) is received by the electronic key and emitted by the vehicle in both the cases mentioned. The feature of the two envelopes 12 and 10 of these received sinusoidal signals Sa and Sb is that they increase only slowly. This slow increase is due to the fact that the internal electronic network of the key (not shown) is parameterized in such a way that any signal emitted by the vehicle at the usual frequency of 125 kHz is received by the electronic key in an electrical circuit in resonance with this frequency because, in the case of resonance, the range of the signal is increased, which represents a desired advantage for a hands-free system.

However, in the case of resonance, the time taken for the signal to establish its nominal amplitude is increased. The envelope 12 of the received sinusoidal signal Sa therefore increases relatively slowly in the case of a standard Q factor. The reduction in the Q factor of the key then allows a faster rise in amplitude of the envelope 10 of the received sinusoidal signal Sb.

More precisely, the nominal detection threshold 16 of the received sinusoidal signals Sa and Sb received by the electronic key can vary, as a function of the noise, between two thresholds, a maximum threshold 15 and a minimum threshold 17, defining a zone Z of uncertainty of detection. Thus, it is apparent that the number of sinusoids at the start of the reception 11 of the received sinusoidal signal Sa in the uncertainty zone Z is substantially above the number of sinusoids at the start of the reception 12 of the received sinusoidal signal Sb (FIG. 2b) in this same uncertainty zone. The sinusoids situated in the uncertainty zone Z are likely to go undetected by the electronic key. The detection of the received sinusoidal signals Sa and Sb being validated outside this uncertainty zone, it is advisable to modify the envelope 12 of the signal so that it crosses it as fast as possible thanks to a faster rise in the amplitude of the signal received by the electronic key, which is advantageously achieved by the reduction in the Q factor of this key according to the invention.

The diagram in FIG. 2b shows the sinusoidal signal received by the key with a reduced Q factor according to the invention. In this case, only two periods of the received sinusoidal signal Sb are situated in the duration of uncertainty 12. This duration of uncertainty 12 is therefore equal, in this example, to twice the duration of the period, therefore 2*8=16 milliseconds. Whereas in the case of a standard Q factor, in the envelope 13 (FIG. 2a), this duration of uncertainty 11 of the sinusoid Sa of the received signal is equal to three times the duration of the period, or 3*8=24 milliseconds.

A reduced Q factor certainly deceases the range of reception of a signal, but substantially increases the protection against an interception by a third-party item of electronic equipment. In this context, the invention proposes to reduce the Q factor to a level low enough to cancel as many sinusoids as possible in the uncertainty zone Z.

Figure 3:
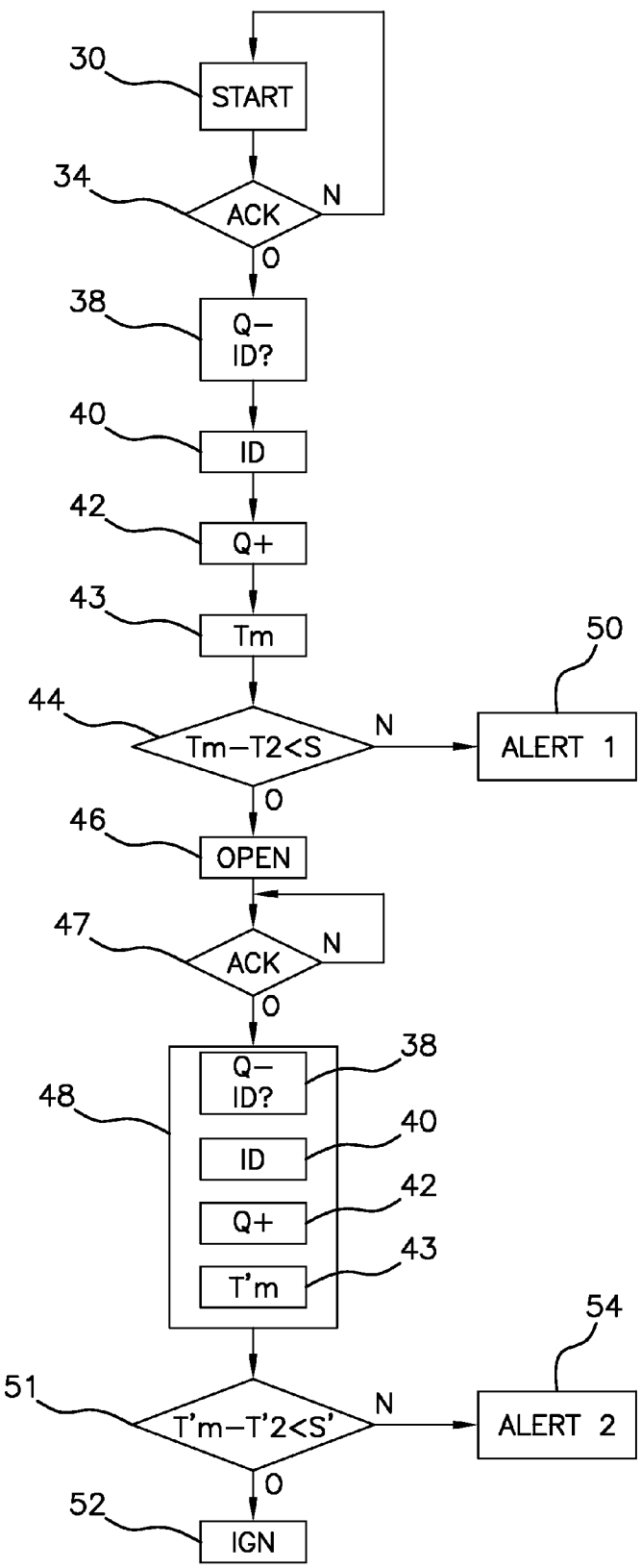
FIG. 3, an example of a flowchart of protection of a hands-free access and starting system according to the invention.

The flowchart in FIG. 3 illustrates the steps of an example of a protection method according to the invention. At the beginning step "Start" 30, the central control unit of the vehicle remains in standby (test 34) awaiting the detection "ack" (short for "acknowledge") of an unlocking request. This request can take the form of an approaching hand, or a pressing on a door handle or key button. Without an unlocking request, the method returns to the "Start" step. In the event of an unlocking request being detected in test 34, the vehicle sends a coded identification request (step 38), each frame of which begins with a header called WUP, for the attention of the electronic key, and also contains a request to reduce the Q factor made by the central control unit for the attention of the electronic key.

The transmission of the coded identification request of this step 38 sent to the key is a step implemented by the coded interrogation signals 5 or 5' of the protocol between the vehicle and the key, without or with interception respectively (cf. FIGS. 1a and 1b).

This request for a reduction in the Q factor for the attention of the electronic key is made in this example using an additional existing frame sent in step 38 and including a particular pattern, called wake-up pattern, and not including any data, for a preset time.

Alternatively, it is possible to request a reduction in the Q factor of the electronic key by creating an additional frame.

Advantageously, the electronic key that has received the request for a reduction in the Q factor performs this reduction gradually after receiving the request for a reduction in the Q factor or immediately after receiving it, in order to avoid disturbing other operations which it is currently carrying out.

The response of the electronic key (step 40) is also coded and is then made with the reduced Q factor. The response of the electronic key is contained in the response signal that can be delayed or not delayed (signal 7' or 7, cf. above with reference to FIG. 1b).

Then the electronic key resumes its standard Q factor (step 42). The duration Tm, sum of the durations of performance of steps 38 and 40, is computed (step 43), this duration Tm being then compared to a reference duration T2 (test 44).

If the difference Tm−T2 is below a preset threshold S, of 50 milliseconds in the example, the method concludes that there is an absence of interception by a third-party item of electronic equipment. It then continues with a step of access authorization "open" (step 46) by unlocking the doors. If the difference Tm−T2 is above the threshold S, the method concludes that an interception by a third-party item of electronic equipment is present, and triggers (step 50) alarms, for example: preventing the unlocking of the openings, or audible or visual alarms on the vehicle.

Following the unlocking of the doors, a detection "ack" of a request to start the vehicle can be received by the central control unit in the test 47, for example by a start button being pressed. Said unit then addresses to the electronic key a set of protection steps 48 composed of steps 38, 40, 42 and 43 resuming those described in the access authorization request, namely:

- a request for a reduction in the Q factor made by the central control unit for the attention of the electronic key included in the coded identification request made by the central control unit for the attention of the electronic key (step 38),
- a response from the electronic key with a reduced Q factor (step 40),
- a resumption by the key of its standard Q factor (step 42), and
- a measurement T'm of the sum of the durations of these protection steps (step 43).

As for the protection steps concerning access authorization, this duration T'm is compared to a reference duration T'2 (test 51 similar to the test 44). If, during this test 51, the difference T'm−T'2 is below a preset threshold S', the start IGN is triggered (step 52). If the difference T'm−T'2 is above the preset threshold S', the central control unit concludes that a third-party item of electronic equipment is present. Alarms are then triggered (step 54), for example: blocking of the starting process, or audible or visual alarms on the dashboard.

The invention claimed is:

1. A method for protecting a hands-free access and/or starting system of a motor vehicle equipped with at least one electronic key, comprising:
    a step of emitting a coded identification request (38) emitted by an antenna of a central control unit of said system in the form of a coded interrogation signal (5, 5') intended for the electronic key (K);
    a step of the electronic key (K) responding to give its identity (40); and
    a step of authorizing the access to (46) and/or starting of the vehicle (52),
    wherein said method furthermore comprises, before the step of authorizing the access to (46) and/or starting of the vehicle (52), additional protection steps consisting in:
        adapting the amplitude of at least one sinusoidal signal (Sa) received by the key in the coded identification request step (38) to reach an amplitude detection threshold (15, 16, 17) of the electronic key (K) as soon as possible;
        stopping said amplitude adaptation (42) as soon as the electronic key (K) is identified in the responding step (40);
        measuring (43) a sum (Tm, T'm) of durations of transmission of the coded interrogation signal (5, 5') and of the response signal (7, 7', 9) of the electronic key;
        comparing (44, 51) the sum of the measured durations (Tm, T'm) to a reference duration (S, S');
        prohibiting the access to and/or starting of the vehicle when a difference between this sum of measured durations (Tm, T'm) and the reference duration (T2, T'2) is above a preset threshold (S, S'); and
        triggering alarms (50, 54) when the difference between this sum of measured durations (Tm, T'm) and the reference duration (T2, T'2) is above the preset threshold (S,S').

2. The protection method as claimed in claim 1, characterized in that the step of adapting of the amplitude of the sinusoidal signal (Sa, Sb) received by the electronic key in the coded identification request step (38) is achieved by a reduction (Q−) in the quality factor of said key, called "Q factor".

3. The protection method as claimed in claim 2, characterized in that the reduction (Q−) in the Q factor is requested by the central control unit upon the emission of the coded identification request (38).

4. The protection method as claimed in claim 3, characterized in that the request for a reduction in the Q factor of the key consists in the emission of an additional frame without preset duration data.

5. The protection method as claimed in claim 4, characterized in that the reduction in the Q factor of the electronic key is performed gradually after reception of the request for a reduction in the Q factor.

6. The protection method as claimed in claim 4, characterized in that the reduction in the Q factor of the electronic key is performed immediately after reception of the request for a reduction in the Q factor.

7. The protection method as claimed in claim 3, characterized in that the request for a reduction in the Q factor of the key consists in a change in the length of the coded interrogation signal (5, 5').

8. The protection method as claimed in claim 7, characterized in that the reduction in the Q factor of the electronic key is performed immediately after reception of the request for a reduction in the Q factor.

9. The protection method as claimed in claim 7, characterized in that the reduction in the Q factor of the electronic key is performed gradually after reception of the request for a reduction in the Q factor.

10. The protection method as claimed in claim 1, characterized in that the sum of the measured durations (Tm, T'm) is computed from several sensors distributed over the vehicle.

11. The protection method as claimed in claim 1, characterized in that the reference duration (T2, T'2) corresponds to a duration of an electromagnetic two-way communication between the vehicle and the electronic key without interception of communication.

12. The protection method as claimed in claim 1, characterized in that the threshold (S, S') above which alarms are triggered is comprised between 5 and 100 milliseconds.

13. The protection method as claimed in claim 12, characterized in that the threshold (S, S') above which alarms are triggered is comprised between 8 and 64 milliseconds.

* * * * *